US011180132B2

(12) United States Patent  
Nakayama et al.

(10) Patent No.: US 11,180,132 B2  
(45) Date of Patent: Nov. 23, 2021

(54) VEHICLE CONTROL DEVICE AND CONTROL METHOD OF VEHICLE

(71) Applicant: TOYOTA JIDOSHA KABUSHIKI KAISHA, Toyota (JP)

(72) Inventors: Katsushi Nakayama, Toyota (JP); Satoru Takahashi, Nissin (JP); Hiroyuki Tateno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 16/677,849

(22) Filed: Nov. 8, 2019

(65) Prior Publication Data

US 2020/0156621 A1    May 21, 2020

(30) Foreign Application Priority Data

Nov. 20, 2018    (JP) .............................. JP2018-217772

(51) Int. Cl.  
*B60W 20/17*        (2016.01)  
*G05D 1/00*         (2006.01)  
(Continued)

(52) U.S. Cl.  
CPC ............ *B60W 20/17* (2016.01); *B60K 6/365* (2013.01); *B60K 31/00* (2013.01); *B60W 10/06* (2013.01);  
(Continued)

(58) Field of Classification Search  
CPC ...... B60W 20/17; B60W 30/18; B60W 10/06; B60W 10/08; B60W 10/115;  
(Continued)

(56) References Cited

U.S. PATENT DOCUMENTS 5,788,010 A *   8/1998   Mukai .................. B62D 5/0463  
                                                          180/443  
7,222,004 B2    5/2007   Anderson  
(Continued)

FOREIGN PATENT DOCUMENTS

DE    10 2016 120 510 A1    5/2017  
JP         10-232137 A      9/1998  
(Continued)

*Primary Examiner* — Mary Cheung  
(74) *Attorney, Agent, or Firm* — Oblon, McClelland, Maier & Neustadt, L.L.P.

(57) ABSTRACT

A control device includes an electronic control unit. The electronic control unit is configured to perform autonomous driving of a vehicle to autonomously control at least a vehicle speed so that the vehicle speed follows a preset target vehicle speed; store a relationship between the vehicle speed and noise that is generated by a vehicle part rotated in association with running of the vehicle; determine, based on the relationship, whether the noise is equal to or larger than a preset determination threshold when the vehicle runs at the target vehicle speed; and when the electronic control unit determines that the noise is equal to or larger than the determination threshold, determine a vehicle speed at which the noise is lower than the determination threshold, and change the target vehicle speed to the vehicle speed at which the noise is lower than the determination threshold.

6 Claims, 3 Drawing Sheets

(51) Int. Cl.
*B60W 30/18* (2012.01)
*B60W 10/06* (2006.01)
*B60W 10/08* (2006.01)
*B60W 10/115* (2012.01)
*B60K 31/00* (2006.01)
*B60K 6/365* (2007.10)

(52) U.S. Cl.
CPC .......... *B60W 10/08* (2013.01); *B60W 10/115* (2013.01); *B60W 30/18* (2013.01); *G05D 1/0088* (2013.01); *B60W 2400/00* (2013.01); *B60W 2710/06* (2013.01); *B60W 2710/08* (2013.01); *B60W 2710/10* (2013.01); *B60W 2720/106* (2013.01)

(58) Field of Classification Search
CPC ......... B60W 2710/10; B60W 2400/00; B60W 2720/106; B60W 2710/06; B60W 2710/08; B60W 2520/10; B60W 2720/10; B60W 30/143; B60W 2510/0638; B60W 2510/104; B60W 2510/081; B60W 2510/246; B60W 2510/244; G05D 1/0088; B60K 31/00; B60K 6/365; B60K 6/445; B60K 6/547; Y02T 10/62
See application file for complete search history.

(56) References Cited

U.S. PATENT DOCUMENTS

| | | | | |
|---|---|---|---|---|
| 7,292,932 | B1* | 11/2007 | Ledger | B60W 10/06 701/110 |
| 8,104,845 | B2* | 1/2012 | Itoh | B60T 8/4072 303/191 |
| 2002/0006850 | A1* | 1/2002 | Takao | F16H 61/16 477/118 |
| 2008/0122391 | A1 | 5/2008 | Iwase et al. | |
| 2009/0088913 | A1* | 4/2009 | Oyama | B60W 20/15 701/22 |
| 2010/0241308 | A1* | 9/2010 | Kikuchi | B60H 1/00849 701/36 |
| 2014/0248991 | A1* | 9/2014 | Harada | B60W 20/40 477/3 |
| 2019/0308640 | A1* | 10/2019 | Miller | F02P 5/045 |

FOREIGN PATENT DOCUMENTS

| | | |
|---|---|---|
| JP | 2008-143348 A | 6/2008 |
| JP | 2010-284991 A | 12/2010 |
| WO | WO 2010/143030 A1 | 12/2010 |
| WO | WO 2012/117419 A2 | 9/2012 |

\* cited by examiner

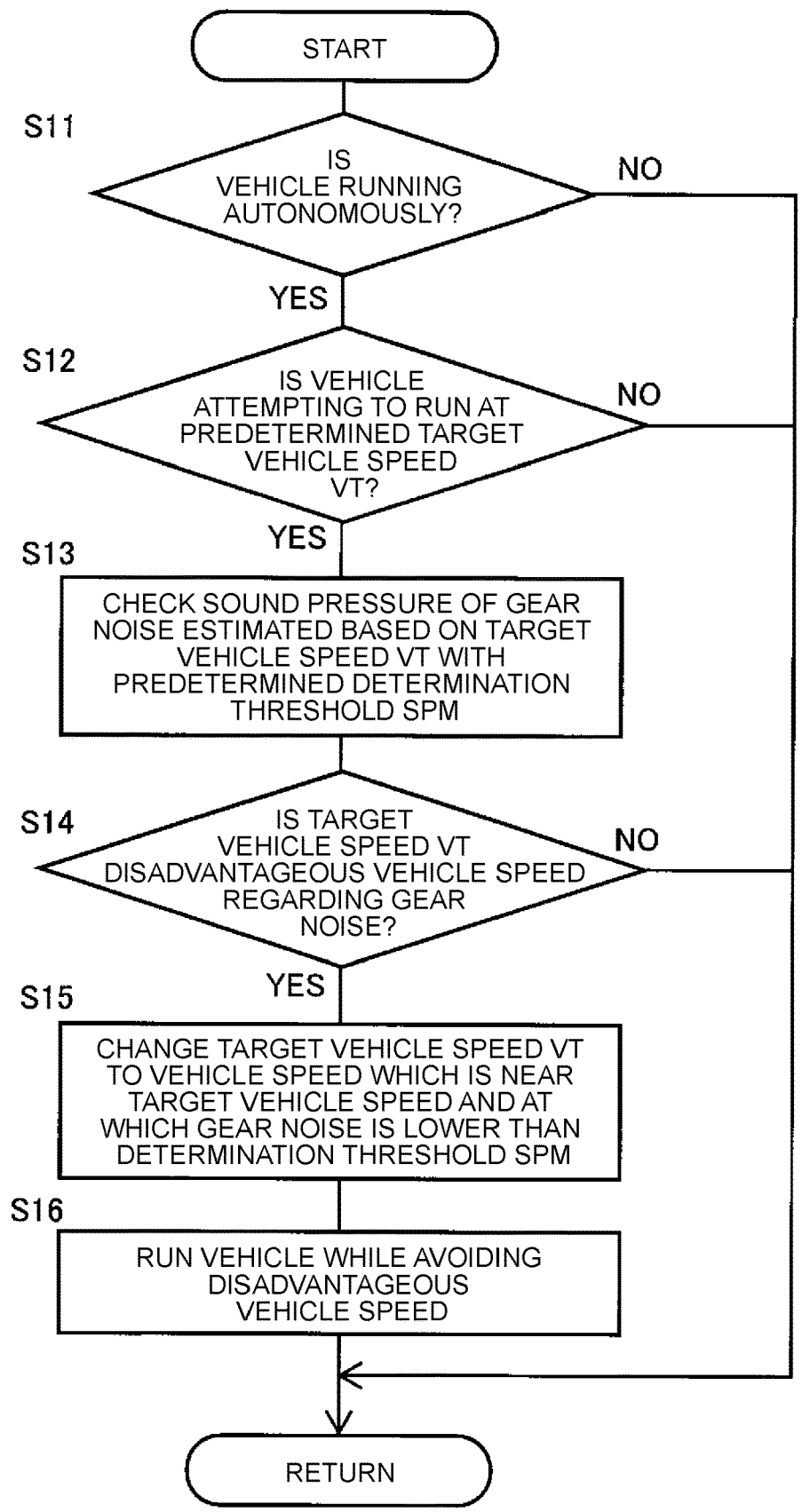

VEHICLE CONTROL DEVICE AND CONTROL METHOD OF VEHICLE

INCORPORATION BY REFERENCE

The disclosure of Japanese Patent Application No. 2018-217772 filed on Nov. 20, 2018 including the specification, drawings and abstract is incorporated herein by reference in its entirety.

BACKGROUND

1. Technical Field

The disclosure relates to vehicle control devices and a control method of a vehicle. More particularly the disclosure relates to a technique of reducing gear noise that is generated during running of a vehicle.

2. Description of Related Art

A vehicle control device is known which transmits output power of a driving source to driving wheels through a transaxle accommodating a transmission and a final reduction gear. For example, Japanese Unexamined Patent Application Publication No. 2010-284991 (JP 2010-284991 A) describes such a vehicle control device. In order to reduce rattling sound of gears in the transaxle during running of a vehicle, this vehicle control device performs control to change the engine speed and the engine output torque to shift the engine operating point out of a region where rattling sound tends to be produced.

SUMMARY

Some of the vehicle parts that are rotated in association with running of a vehicle generate loud noise when the vehicle speed reaches a predetermined value. For example, in the case where a power transmission mechanism includes a planetary gear unit, planetary gears may generate loud gear noise when the vehicle runs at medium speeds. The technique of shifting the engine operating point out of the region where rattling noise tends to be produced as described in JP 2010-284991 A may not be able to reduce noise that is generated by a vehicle part according to the vehicle speed, because this technique does not consider avoidance of noise according to the vehicle speed.

The disclosure provides a control device for a vehicle and a control method of a vehicle, which enables reduction in noise that is generated by a vehicle part according to the vehicle speed.

A first aspect of the disclosure relates to a control device for a vehicle configured to transmit output power of a driving source to a driving wheel through a power transmission mechanism. The control device includes an electronic control unit. The electronic control unit is configured to: perform autonomous driving of the vehicle to autonomously control at least a vehicle speed so that the vehicle speed follows a preset target vehicle speed; store a relationship between the vehicle speed and noise that is generated by a vehicle part rotated in association with running of the vehicle; determine, based on the relationship, whether the noise is equal to or larger than a preset determination threshold when the vehicle runs at the target vehicle speed; and when the electronic control unit determines that the noise is equal to or larger than the determination threshold, determine a vehicle speed at which the noise is lower than the determination threshold, and change the target vehicle speed to the vehicle speed at which the noise is lower than the determination threshold.

According to the above configuration, the control device is configured to determine, based on the relationship, whether the noise is equal to or larger than the preset determination threshold when the vehicle runs at the target vehicle speed, and when the electronic control unit determines that the noise is equal to or larger than the determination threshold, determine a vehicle speed at which the noise is lower than the determination threshold, and change the target vehicle speed to the vehicle speed at which the noise is lower than the determination threshold. Noise that is generated by the vehicle part rotated in association with running of the vehicle is thus reduced.

In the above aspect, the vehicle may be a hybrid vehicle including an engine, a front planetary gear unit, and a rear planetary gear unit. The front planetary gear unit may be coupled to the engine. The front planetary gear unit may include a first rotary element supporting a front planetary gear such that the front planetary gear is rotatable and revolvable, a second rotary element coupled to a first electric motor, and a third rotary element coupled to an output rotary member that outputs power to the driving wheel. The rear planetary gear unit may be coupled to a position fixing member. The rear planetary gear unit may include a fourth rotary element supporting a rear planetary gear such that the rear planetary gear is rotatable, a fifth rotary element coupled to a second electric motor, and a sixth rotary element coupled to the output rotary member. The vehicle part may be the rear planetary gear of the rear planetary gear unit. The rear planetary gear tends to rotate at relatively high speeds according to the vehicle speed and tends to generate gear noise. Gear noise that is generated by the rear planetary gear is thus appropriately reduced.

In the above aspect, the relationship may be a relationship obtained in advance for each of the vehicles from the vehicle speed and a sound pressure of the noise at the vehicle speed. In this case, the relationship between the vehicle speed and the sound pressure of the noise that is generated by the vehicle part is obtained in advance for each vehicle, and based on this relationship, the control device changes the target vehicle speed of the vehicle so as to reduce noise that is generated by the vehicle part, and controls the vehicle speed to the changed target vehicle speed. Noise that is generated by the vehicle part rotated in association with running of the vehicle is thus reduced.

In the above aspect, the determination threshold may be a control value that is lower than preset maximum allowable noise by a predetermined value. Noise that is generated by the vehicle part rotated in association with running of the vehicle is thus reduced.

In the above aspect, the determination threshold may change with the vehicle speed. An appropriate vehicle speed is thus set according to the vehicle speed.

A second aspect of the disclosure relates to a control method of a vehicle configured to transmit output power of a driving source to a driving wheel through a power transmission mechanism. The control method includes: performing, by an electronic control unit, autonomous driving of the vehicle to autonomously control at least a vehicle speed so that the vehicle speed follows a preset target vehicle speed; storing, by the electronic control unit, a relationship between the vehicle speed and noise that is generated by a vehicle part rotated in association with running of the vehicle; determining, by the electronic control unit, based on the relationship, whether the noise is equal to or larger than a preset determination threshold when the vehicle runs at the target vehicle speed; and when the electronic control unit determines that the noise is equal to or larger than the determination threshold, determining, by the electronic control unit, a vehicle speed at which the noise is lower than the determination threshold, and changing, by the electronic control unit, the target vehicle speed to the vehicle speed at which the noise is lower than the determination threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an example of a flowchart illustrating a main part of the control operation of the electronic control unit.

DETAILED DESCRIPTION OF EMBODIMENTS

An embodiment of the disclosure will be described in detail with reference to the accompanying drawings.

Figure 1:
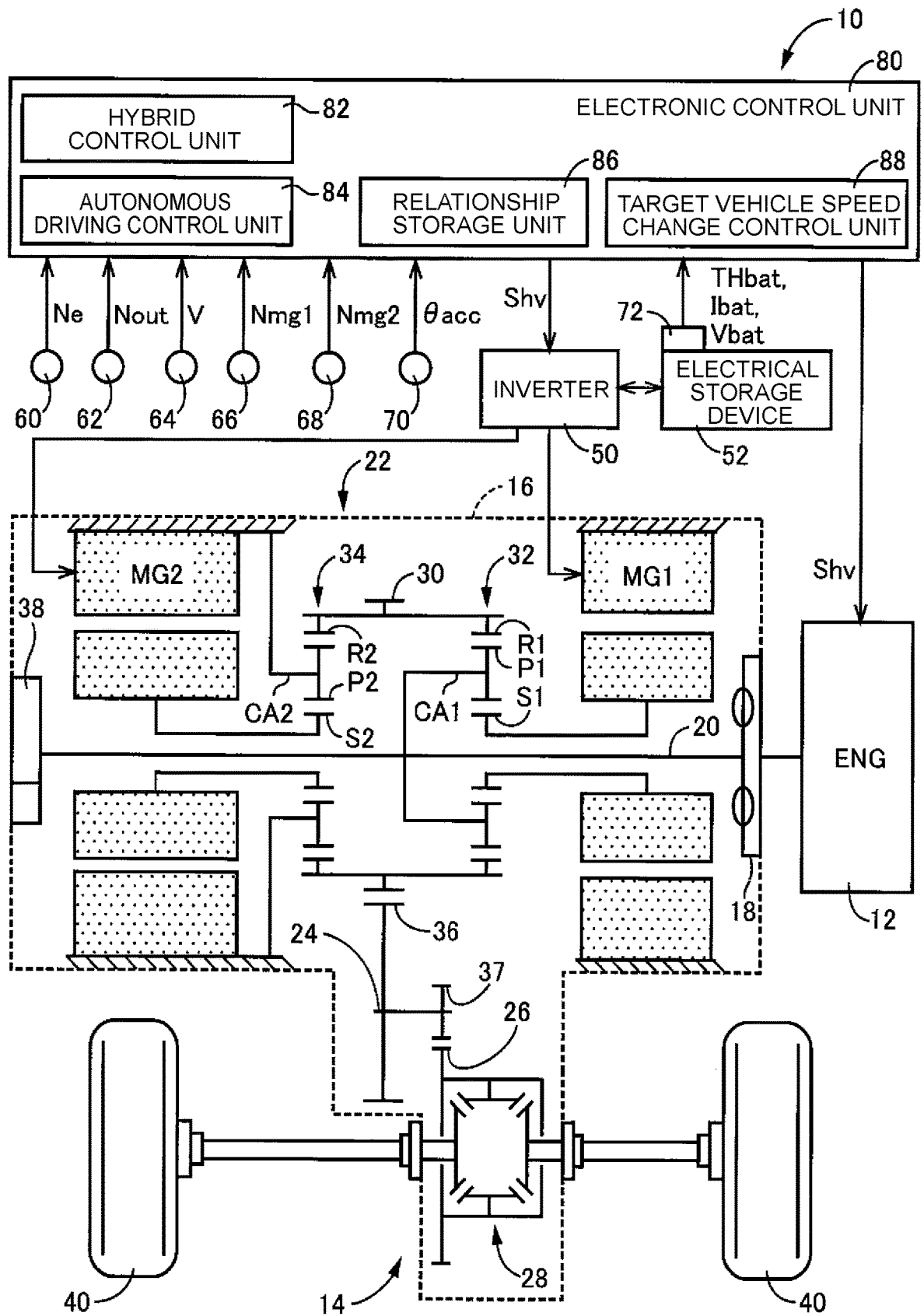
FIG. 1 is a diagram illustrating a schematic configuration of a hybrid vehicle equipped with an electronic control unit according to an embodiment of the disclosure and also illustrating a main part of an electronic control system.

FIG. 1 is a diagram illustrating a schematic configuration of a hybrid vehicle 10 (hereinafter referred to as the vehicle 10) equipped with an electronic control unit 80 according to an embodiment of the disclosure, and illustrating a main part of a control system mounted on the vehicle 10.

The vehicle 10 includes an engine 12 serving as a driving force source for running the vehicle 10 and a power transmission device 14 serving as a transaxle (T/A). The power transmission device 14 includes a damper 18, an input shaft 20, a shifting unit 22, a counter gear shaft 24, a final gear 26, a differential gear unit 28 (final reduction gear), etc. in this order from the engine 12 side in a transaxle case 16 that is a non-rotary member attached to a vehicle body. The shifting unit 22 has a first electric motor MG1, a power distribution mechanism 32, a planetary gear reduction gear mechanism 34, and a second electric motor MG2. The power distribution mechanism 32 distributes output power of the engine 12 to the first electric motor MG1 and an output gear 30. The reduction gear mechanism 34 is coupled to the output gear 30 that is an output rotary member. The second electric motor MG2 is coupled to the output gear 30 via the reduction gear mechanism 34 so that power can be transmitted to the output gear 30 through the reduction gear mechanism 34. The counter gear shaft 24 includes a counter driven gear 36 meshing with the output gear 30, and a drive pinion gear 37 meshing with the final gear 26.

The input shaft 20 has its one end coupled to the engine 12 via the damper 18 and is thus rotationally driven by the engine 12. An oil pump 38 is coupled to the other end of the input shaft 20. When the input shaft 20 is rotationally driven, the oil pump 38 is rotationally driven accordingly to supply lubricating oil to each part of the power transmission device 14 such as, e.g., the power distribution mechanism 32, the reduction gear mechanism 34, and a ball bearing, not shown. In such a power transmission device 14, the power of the engine 12 which is input through the damper 18 and the input shaft 20 and the power of the second electric motor MG2 are transmitted to the output gear 30 that is an output rotary member, and are transmitted from the output gear 30 to a pair of driving wheels 40 sequentially through the counter gear shaft 24, the final gear 26, the differential gear unit 28, a pair of axles, etc.

The power distribution mechanism 32 is a known single pinion planetary gear unit including, as rotary elements, a first sun gear S1, a first carrier CA1 supporting a first pinion P1 such that the first pinion P1 is rotatable and revolvable, and a first ring gear R1 meshing with the first sun gear S1 via the first pinion P1. The power distribution mechanism 32 functions as a differential mechanism that produces a differential action. The first carrier CA1, which functions a first rotary element, is coupled to the engine 12 via the input shaft 20. The first sun gear S1, which functions a second rotary element, is coupled to the first electric motor MG1. The first ring gear R1, which functions a third rotary element, is coupled to the output gear 30 that is an output rotary member. The power distribution mechanism 32 distributes the output power of the engine 12 to the first electric motor MG1 and the output gear 30. The first electric motor MG1 generates electricity as the power of the engine 12 is distributed to the first electric motor MG1. The electrical energy thus generated is stored in an electrical storage device 52 through an inverter 50 or the second electric motor MG2 is rotationally driven by this electrical energy. While the engine 12 is stopped, the engine 12 is rotationally driven (cranked) to start by the output power of the first electric motor MG1 via the power distribution mechanism 32.

The reduction gear mechanism 34 is a known single pinion planetary gear unit including, as rotary elements, a second sun gear S2, a second carrier CA2 supporting a second pinion P2 such that the second pinion P2 is rotatable, and a second ring gear R2 meshing with the second sun gear S2 via the second pinion P2. The transaxle case 16 is a non-rotary position fixing member, and the second carrier CA2, which functions a fourth rotary element, is coupled to the transaxle case 16, so that rotation of the second carrier CA2 is inhibited. The second sun gear S2, which functions a fifth rotary element, is coupled to the second electric motor MG2. The second ring gear R2, which functions a sixth rotary element, is coupled to the output gear 30. For the reduction gear mechanism 34, for example, the gear ratio of the planetary gear unit itself is set so that the planetary gear unit functions as a reduction gear. For example, during power running in which torque is output from the second electric motor MG2, rotation transmittted from the second electric motor MG2 is reduced in speed and transmitted to the output gear 30, and its torque is increased and transmitted to the output gear 30. The output gear 30 is a composite gear having both the function as the first ring gear R1 of the power distribution mechanism 32 and the second ring gear R2 of the reduction gear mechanism 34 and the function as a counter drive gear that meshes with the counter driven gear 36 to form the counter gear shaft 24.

For example, the first electric motor MG1 and the second electric motor MG2 are synchronous electric motors that have a motor function to generate mechanical power from electrical energy and that may have, in addition to the motor function, an electric motor function to generate electrical energy from mechanical power. For example, the first electric motor MG1 has the motor function in order to rotationally drive the stopped engine 12 and has the electric motor function in order to cancel the reaction force of the engine 12. The second electric motor MG2 has the motor function in order to function as an electric motor for running the vehicle 10 which outputs a driving force as a driving force source for running the vehicle 10, and has the electric motor function in order to generate electrical energy by regeneration from the reverse driving force from the driving wheel 40 side.

The vehicle 10 includes the electronic control unit 80 serving as a control device that controls each part of the vehicle 10. The electronic control unit 80 includes a so-called microcomputer (CPU), for example, and performs various kinds of control of the vehicle 10 by processing input signals according to a prestored program. The electronic control unit 80 performs control of the vehicle 10 such as hybrid drive control for the engine 12, the first electric motor MG1, the second electric motor MG2, etc. The vehicle 10 is equipped with an engine speed sensor 60, an output shaft rotational speed sensor 62, a vehicle speed sensor 64, an MG1 rotational speed sensor 66, an MG2 rotational speed sensor 68, an accelerator operation amount sensor 70, and a battery sensor 72. The engine speed sensor 60 detects an engine speed Ne (rpm), namely the rotational speed of the engine 12. The output shaft rotational speed sensor 62 detects an output shaft rotational speed Nout (rpm), namely the rotational speed of the output gear 30. The vehicle speed sensor 64 detects a vehicle speed V (km/h). The MG1 rotational speed sensor 66 detects an MG1 rotational speed Nmg1 (rpm), namely the rotational speed of the first electric motor MG1. The MG2 rotational speed sensor 68 detects an MG2 rotational speed Nmg2 (rpm), namely the rotational speed of the second electric motor MG2. The accelerator operation amount sensor 70 detects an accelerator operation amount θacc (%) corresponding to the amount of depression of an accelerator pedal. The battery sensor 72 detects a battery temperature THbat (° C.), a battery charge/discharge current Ibat (A), and a battery voltage Vbat (V) of the electrical storage device 52. The electronic control unit 80 receives the engine speed Ne, the output shaft rotational speed Nout, the vehicle speed V, the MG1 rotational speed Nmg1, the MG2 rotational speed Nmg2, the accelerator operation amount θacc, the battery temperature THbat, the battery charge/discharge current Ibat, and the battery voltage Vbat. The electronic control unit 80 outputs hybrid control signals Shv to the engine 12 and the inverter 50 to control operation of the engine 12 and to control operation of the first electric motor MG1 and the second electric motor MG2 via the inverter 50. The electronic control unit 80 calculates the state of charge (charging capacity) SOC (%) of the electrical storage device 52 as appropriate based on, e.g., the battery temperature THbat, the battery charge/discharge current Ibat, the battery voltage Vbat, etc.

Functional blocks illustrating a main part of the control function of the electronic control unit 80 are shown in the electronic control unit 80 of FIG. 1. The electronic control unit 80 includes a hybrid control unit 82, an autonomous driving control unit 84, a relationship storage unit 86, and a target vehicle speed change control unit 88.

The hybrid control unit 82 calculates an output driving torque value Tout from the requested driving amount of the vehicle 10 from the driver based on, e.g., the accelerator operation amount θacc and the vehicle speed V, such as from a requested driving torque value Treq (Nm). The output driving torque value Tout is the magnitude of requested output torque of the output gear 30, and the requested driving torque value Treq is the magnitude of torque requested for the driving wheels 40. The hybrid control unit 82 outputs the hybrid control signals Shv that control operation of the driving force sources (the engine 12 and the second electric motor MG2) in view of a requested charging value of the electrical storage device 52 etc. so as to achieve the output drive torque value Tout. For example, the hybrid control unit 82 selectively establishes a motor drive mode, an engine drive mode (steady drive mode), an assisted drive mode (accelerated drive mode), etc. according to the vehicle state. The motor drive mode is the mode for motor driving (EV driving) in which the vehicle 10 runs with the engine 12 stopped and using only the second electric motor MG2 as a driving source for running the vehicle 10. The engine drive mode is the mode for engine driving in which the reaction force to the power of the engine 12 is cancelled by the electric power generated by the first electric motor MG1 to transmit direct torque of the engine 12 to the driving wheels 40 through the output gear 30, and the second electric motor MG2 is driven by the electric power generated by the first electric motor MG1 to transmit torque to the output gear 30, so that the vehicle 10 runs using at least the engine 12 as a driving source for running the vehicle 10. The assisted drive mode is the mode in which the vehicle 10 runs additionally with the power of the second electric motor MG2 using the electric power from the electrical storage device 52 in the engine drive mode.

The hybrid control unit 82 establishes the motor drive mode when the vehicle state indicated by the vehicle speed V and the requested driving amount (the accelerator operation amount θacc, the requested driving torque value Treq, etc.) is in a motor drive region experimentally obtained and stored in advance. The hybrid control unit 82 establishes the engine drive mode or the assisted drive mode when the vehicle state is in a predetermined engine drive region. The motor drive region is set to a lower output region than the engine drive region. Even when the vehicle state is in the motor drive region, the hybrid control unit 82 operates the engine 12 to run the vehicle 10, for example, in the following cases: when EV driving is not possible as discharge is limited based on the dischargeable electric power according to the state of charge SOC and/or the battery temperature THbat of the electrical storage device 52, that is, based on the output limitation Wout; when charging of the electrical storage device 52 has been requested; and when warming up of the engine 12 and its associated devices is required.

The hybrid control unit 82 determines whether starting of the engine 12 has been requested during EV driving based on, e.g., an increase in the vehicle speed V or requested driving amount, a poor state of charge of the electrical storage device 52, a request to warm up the engine 12, etc. When the hybrid control unit 82 determines that starting of the engine 12 has been requested, the hybrid control unit 82 performs engine start control to start the engine 12. In the engine start control, the hybrid control unit 82 cranks the engine 12 by the power of the first electric motor MG1 to increase the engine speed Ne, thereby starting the engine 12.

The autonomous driving control unit 84 performs autonomous driving of the vehicle 10 to control at least the actual vehicle speed V of the vehicle 10 autonomously rather than by driver's operation. For example, the autonomous driving control unit 84 controls the throttle opening of the vehicle 10 so that the actual vehicle speed V follows, namely matches, a target vehicle speed VT preset by driver's operation. The autonomous driving control unit 84 may control the throttle opening so that the distance to a vehicle ahead becomes equal to a preset interval. That is, the autonomous driving control unit 84 autonomously controls the speed of the vehicle 10 between the target vehicle speed VT and the speed of the vehicle ahead.

Figure 2:
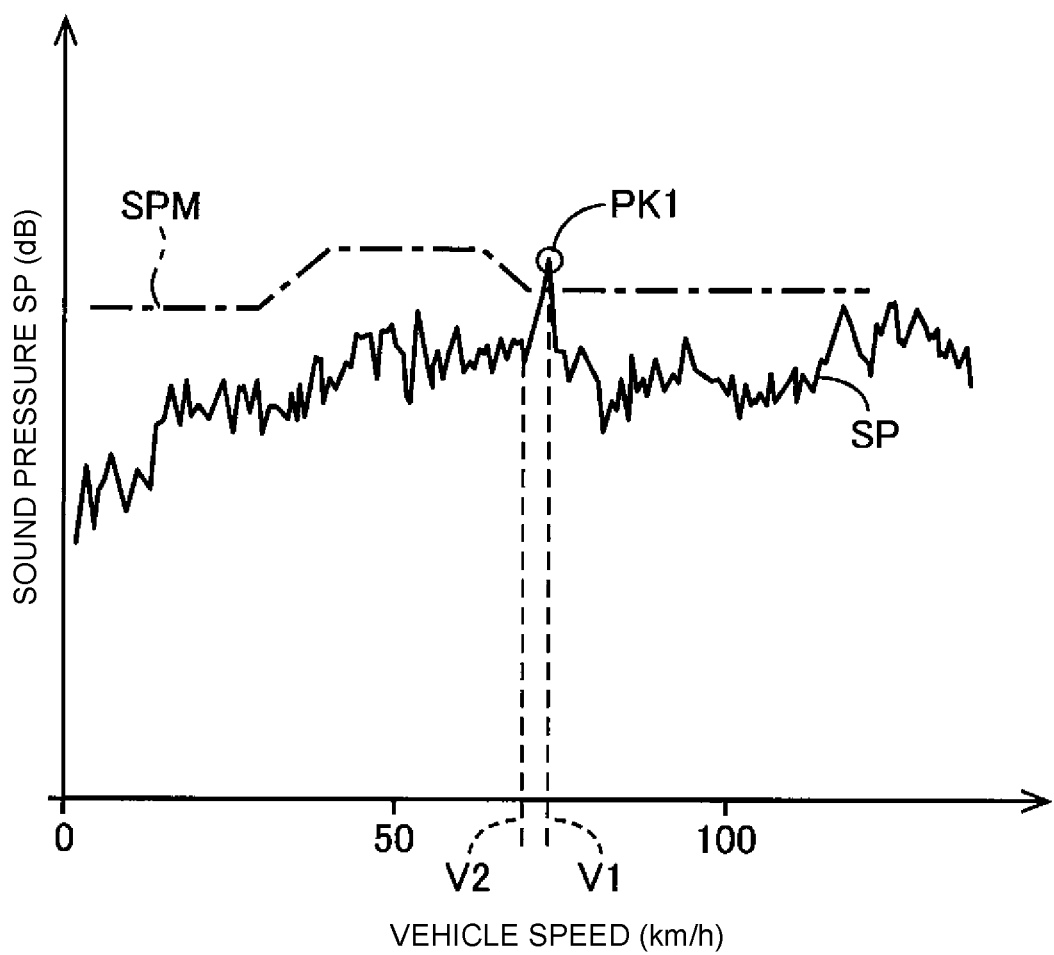
FIG. 2 is a graph showing the relationship between the vehicle speed and the sound pressure of noise generated by a vehicle part, which is obtained for each vehicle and stored in advance in the electronic control unit.

The relationship storage unit 86 stores in advance the relationship between the vehicle speed V of the vehicle 10 and the magnitude of noise sound generated by a vehicle part rotated in association with running of the vehicle 10, such as the second pinion (rear planetary gear) P2, before shipping. This relationship is individually obtained for each vehicle 10. FIG. 2 shows an example of the relationship. In FIG. 2, how the sound pressure of noise changes with respect to the vehicle speed V is shown using two-dimensional coordinates, where the abscissa represents the vehicle speed V and the ordinate represents the sound pressure SP that is the magnitude of noise generated by the vehicle 10. In FIG. 2, the sound pressure SP indicating the magnitude of the noise is the value measured at each vehicle speed based on the sum of signals obtained from four microphones when the vehicle speed V was changed in a substantial running state. The four microphones were disposed around the vehicle 10, and the substantial running state is the state where the driving wheels of the vehicle 10 are rotated on drums on a noise dynamometer.

The target vehicle speed change control unit 88 changes the target vehicle speed VT of the vehicle 10 based on the noise that is actually generated by a vehicle part disposed in a power transmission path and rotated in association with running of the vehicle 10 during autonomous driving of the vehicle 10 by the autonomous driving control unit 84. At this time, the target vehicle speed change control unit 88 changes the target vehicle speed VT of the vehicle 10 so as to reduce noise that is generated by the vehicle part, based on the relationship stored in advance in the relationship storage unit 86. The target vehicle speed change control unit 88 causes the autonomous driving control unit 84 to control the vehicle speed V during autonomous driving to the changed target vehicle speed VT.

FIG. 2 shows a preset sound pressure control determination threshold SPM (determination threshold) for the sound pressure SP. This preset sound pressure control determination threshold SPM for the sound pressure SP is a control value that is lower by a predetermined value than the maximum allowable noise. The preset sound pressure control determination threshold SPM may be a fixed value, but in the present embodiment, is set so as to change with the speed V of the vehicle 10 according to the characteristics of the vehicle 10, as shown in FIG. 2. The waveform and peak of the sound pressure SP of noise that is generated from the transaxle case 16 varies depending on the individual vehicle 10 due to variation in tooth surface accuracy of the second pinion P2, variation in resonance point resulting from variation in rigidity and thickness of the transaxle case 16, etc.

FIG. 2 also shows a peak PK1 at the vehicle speed of 71 to 73 km/h. The peak PK1 is the point at which the sound pressure SP is equal to or higher than the preset sound pressure control determination threshold SPM. The target vehicle speed change control unit 88 compares the target vehicle speed VT with the relationship shown in FIG. 2. When the target vehicle speed change control unit 88 determines that the sound pressure SP corresponding to the target vehicle speed VT is equal to or higher than the preset sound pressure control determination threshold SPM, the target vehicle speed change control unit 88 determines a vehicle speed V2 that is not so far from the target vehicle speed VT out of the vehicle speeds V at which the sound pressure SP is sufficiently lower than the sound pressure control determination threshold SPM. For example, the target vehicle speed VT is set to 71 to 73 km/h, and the vehicle speed V2 is set to about 70 km/h. The target vehicle speed change control unit 88 then changes the target vehicle speed VT that is used during autonomous driving of the vehicle 10 by the autonomous driving control unit 84 to the determined vehicle speed V2. The vehicle speed V2 may be set to either a value lower than a vehicle speed V1 corresponding to the peak PK1 as shown in FIG. 2 or a value higher than the vehicle speed V1.

In FIG. 2, it is estimated from the frequency of the peak PK1 that the peak PK1 at the vehicle speed V1 at which the sound pressure SP is equal to or higher than the sound pressure control determination threshold SPM is secondary meshing noise of the second pinion (rear planetary gear) P2. However, vehicle parts that can be a noise source include not only the second pinion P2 but also the counter driven gear 36, the drive pinion gear 37, etc. Accordingly, the peaks of the sound pressure SP resulting from primary meshing noise and secondary meshing noise of the counter driven gear 36 and the drive pinion gear 37 and primary meshing noise of the second pinion P2 may become equal to or higher than the preset sound pressure control determination threshold SPM during autonomous driving of the vehicle 10. Even in such a case, the target vehicle speed change control unit 88 refers to the relationship stored in advance in the relationship storage unit 86 and determines based on the target vehicle speed VT the vehicle speed V2 of the vehicle 10 at which the sound pressure SP of estimated noise is lower than the sound pressure control determination threshold SPM. The target vehicle speed change control unit 88 then changes the target vehicle speed VT that is used during autonomous driving of the vehicle 10 by the autonomous driving control unit 84 to the determined vehicle speed V2.

FIG. 3 is an example of a flowchart illustrating a main part of the control operation of the electronic control unit 80, that is, illustrating the control operation of reducing the sound pressure SP of noise from the vehicle part rotated in association with running of the vehicle 10, such as the second pinion P2, during autonomous driving of the vehicle 10.

In FIG. 3, the electronic control unit 80 determines in step S11 (hereinafter the term "step" will be omitted) whether the autonomous driving control unit 84 is performing autonomous driving of the vehicle 10. When the electronic control unit 80 determines in S11 that the autonomous driving control unit 84 is not performing autonomous driving of the vehicle 10, the electronic control unit 80 terminates the routine. However, when the electronic control unit 80 determines in S11 that the autonomous driving control unit 84 is performing autonomous driving of the vehicle 10, the electronic control unit 80 determines in S12 whether the vehicle 10 is attempting to run at a predetermined target vehicle speed VT. When the electronic control unit 80 determines in S12 that the vehicle 10 is not attempting to run at the predetermined target vehicle speed VT, the electronic control unit 80 terminates the routine. However, when the electronic control unit 80 determines in S12 that the vehicle 10 is attempting to run at the predetermined target vehicle speed VT, the electronic control unit 80 performs S13, S14, and S15 corresponding to the target vehicle speed change control unit 88.

In S13, the target vehicle speed change control unit 88 refers to the relationship of FIG. 2 stored in advance in the relationship storage unit 86 and checks (compares) the sound pressure SP of noise estimated to be generated from the transaxle case 16 based on the target vehicle speed VT for autonomous driving with the preset sound pressure control determination threshold SPM.

The target vehicle speed change control unit 88 then determines in S14 whether the target vehicle speed VT is such a disadvantageous vehicle speed that the sound pressure SP of the noise is equal to or higher than the preset sound pressure control determination threshold SPM.

When the target vehicle speed change control unit 88 determines in S14 that the target vehicle speed VT is not the disadvantageous vehicle speed, the electronic control unit 80 terminates the routine. However, when the target vehicle speed change control unit 88 determines in S14 that the target vehicle speed VT is the disadvantageous vehicle speed, the target vehicle speed change control unit 88 changes in S15 the target vehicle speed VT to a vehicle speed which is near the target vehicle speed VT and at which the sound pressure SP of the noise is lower than the preset sound pressure control determination threshold SPM. For example, as shown in FIG. 2, when the target vehicle speed change control unit 88 determines that the sound pressure SP is equal to or higher than the preset sound pressure control determination threshold SPM at the vehicle speed V1, the target vehicle speed change control unit 88 determines the vehicle speed V2 that is not so far from the vehicle speed V1 out of the vehicle speeds at which the sound pressure P is sufficiently lower than the sound pressure control determination threshold SPM. The target vehicle speed change control unit 88 then changes the target vehicle speed VT that is used during autonomous driving of the vehicle 10 by the autonomous driving control unit 84 to the vehicle speed V2.

In S16, the autonomous driving control unit 84 continues autonomous driving of the vehicle 10 by using the target vehicle speed VT changed in S15. The vehicle 10 thus autonomously runs while avoiding the disadvantageous vehicle speed at which the sound pressure SP of the noise is equal to or higher than the sound pressure control determination threshold SPM.

As described above, the electronic control unit 80 of the present embodiment includes the autonomous driving control unit 84, the relationship storage unit 86, and the target vehicle speed change control unit 88. The autonomous driving control unit 84 performs autonomous driving of the vehicle 10 to autonomously control at least the vehicle speed V so that the vehicle speed V follows the target vehicle speed VT. The relationship storage unit 86 stores the relationship between the vehicle speed V and noise that is generated by a vehicle part (e.g., the second pinion P2) rotated in association with running of the vehicle 10 as shown in FIG. 2. The target vehicle speed change control unit 88 determines from the relationship whether the noise that is generated from the vehicle part when the vehicle 10 runs at the target vehicle speed VT is equal to or larger a preset determination threshold (e.g., the sound pressure control determination threshold SPM). When the target vehicle speed change control unit 88 determines that the noise is equal to or larger than the determination threshold, the target vehicle speed change control unit 88 determines the vehicle speed V2 at which the noise is lower than the determination threshold, and changes the target vehicle speed VT to the vehicle speed V2 at which the noise is lower than the determination threshold. With this configuration, the autonomous driving control unit 84 controls the vehicle speed V during autonomous driving to the vehicle speed V2 at which the noise is lower than the preset determination threshold. Noise that is generated by the vehicle part rotated in association with traveling of the vehicle is thus appropriately reduced.

The vehicle 10 of the present embodiment is a hybrid vehicle including the engine 12, the power distribution mechanism (front planetary gear unit) 32, and a reduction gear unit (rear planetary gear unit) 28. The power distribution mechanism (front planetary gear unit) 32 is coupled to the engine 12 and includes the first carrier (first rotary element) CA1 supporting the first pinion (front planetary gear) P1 such that the first pinion P1 is rotatable and revolvable, the first sun gear (second rotary element) S1 coupled to the first electric motor MG1, and the ring gear (third rotary element) R1 coupled to the output gear (output rotary member) 30 that outputs power to the driving wheels 40. The reduction gear unit (rear planetary gear unit) 28 is coupled to the position fixing member, and includes the second carrier (fourth rotary element) CA2 supporting the second pinion (rear planetary gear) P2 such that the second pinion P2 is rotatable, the second sun gear (fifth rotary element) S2 coupled to the second electric motor MG2, and the second ring gear (sixth rotary element) R2 coupled to the output gear (output rotary member) 30. The vehicle part whose noise is reduced by changing the target vehicle speed VT is the second pinion (rear planetary gear) P2. The second pinion P2 tends to rotate at relatively high speeds according to the vehicle speed V and tends to generate gear noise. However, since the target vehicle speed VT of the vehicle 10 is changed so as to reduce noise that is generated by the second pinion P2, the gear noise that is generated by the second pinion P2 during autonomous driving is thus appropriately reduced.

According to the electronic control unit 80 of the present embodiment, the relationship shown in FIG. 2 is produced in advance for each of the vehicles 10 from the vehicle speed V and the sound pressure SP that is generated by the vehicle part at the vehicle speed V. The target vehicle speed change control unit 88 thus changes based on this relationship the target vehicle speed VT of the vehicle 10 so as to reduce the sound pressure SP of the noise that is generated by the vehicle part, and controls the vehicle speed V to the changed target vehicle speed VT. Accordingly, noise that is generated by the vehicle part rotated in association with running of the vehicle is reduced.

According to the electronic control unit 80 of the present embodiment, the determination threshold is a control value that is lower than preset maximum allowable noise by a predetermined value. That is, the determination threshold is the sound pressure control determination threshold SPM. Accordingly, noise that is generated by the vehicle part rotated in association with running of the vehicle is reduced.

According to the electronic control unit 80 of the present embodiment, the determination threshold changes with the vehicle speed V. An appropriate target vehicle speed VT is thus set according to the vehicle speed V.

Although the embodiment of the disclosure is described above with reference to the drawings, the disclosure is also applicable in other forms.

In the vehicle 10 of the above embodiment, the second electric motor MG2 is indirectly coupled to the output gear 30 via the reduction gear mechanism 34. However, the disclosure is not limited to this. For example, the disclosure is also applicable to a vehicle in which the second electric motor MG2 is directly coupled to the output gear 30, a vehicle in which the second electric motor MG2 is coupled to a rotary member located closer to the driving wheels 40 than the output gear 30 and is indirectly coupled to the output gear 30 so that power can be transmitted to the output gear 30, etc.

In the above embodiment, the power distribution mechanism 32 is a single pinion planetary gear unit. However, the power distribution mechanism 32 may be a double pinion planetary gear unit. Alternatively, the power distribution mechanism 32 may be, e.g., a differential gear unit in which a pinion that is rotationally driven by the engine 12 and a pair of bevel gears meshing with the pinion are operatively coupled to the first electric motor MG1 and the output gear 30.

In the above embodiment, the power distribution mechanism 32 is a differential mechanism including a single planetary gear unit and having three rotary elements. However, the disclosure is not limited to this. For example, the power distribution mechanism 32 may be a power distribution mechanism in which two planetary gear units are coupled and thus together form a single differential mechanism.

The vehicle 10 need not necessarily be a two-motor hybrid vehicle using the engine 12 and the two electric motors MG1, MG2 as driving sources. The vehicle 10 may be a single-motor hybrid vehicle using an engine and a single electric motor as driving sources, a series hybrid vehicle, an electric vehicle using an electric motor as a driving source, a vehicle including a planetary gear multi-stage automatic transmission, etc.

The above is merely an embodiment of the disclosure, and the disclosure can be carried out in various modified and improved forms based on the knowledge of those skilled in the art without departing from the scope of the disclosure.

What is claimed is:

1. A control device for a vehicle configured to transmit output power of a driving source to a driving wheel through a power transmission mechanism, the control device comprising an electronic control unit:
   perform autonomous driving of the vehicle to autonomously control at least a vehicle speed so that the vehicle speed follows a target vehicle speed that is set in advance;
   store a relationship between the vehicle speed and noise that is generated by a vehicle part rotated in association with running of the vehicle;
   determine, based on the relationship, whether the noise is equal to or larger than a determination threshold when the vehicle runs at the target vehicle speed, the determination threshold being set in advance; and
   when the electronic control unit determines that the noise is equal to or larger than the determination threshold, determine a vehicle speed at which the noise is lower than the determination threshold, and change the target vehicle speed to the vehicle speed at which the noise is lower than the determination threshold.

2. The control device according to claim 1, wherein:
   the vehicle is a hybrid vehicle including an engine, a front planetary gear unit, and a rear planetary gear unit;
   the front planetary gear unit is coupled to the engine;
   the front planetary gear unit includes a first rotary element supporting a front planetary gear such that the front planetary gear is rotatable and revolvable, a second rotary element coupled to a first electric motor, and a third rotary element coupled to an output rotary member that outputs power to the driving wheel;
   the rear planetary gear unit is coupled to a position fixing member;
   the rear planetary gear unit includes a fourth rotary element supporting a rear planetary gear such that the rear planetary gear is rotatable, a fifth rotary element coupled to a second electric motor, and a sixth rotary element coupled to the output rotary member; and
   the vehicle part is the rear planetary gear of the rear planetary gear unit.

3. The control device according to claim 1, wherein the relationship is a relationship obtained in advance for each of the vehicles from the vehicle speed and a sound pressure of the noise at the vehicle speed.

4. The control device according to claim 1, wherein the determination threshold is a control value that is lower than preset maximum allowable noise by a predetermined value.

5. The control device according to claim 1, wherein the determination threshold changes with the vehicle speed.

6. A control method of a vehicle configured to transmit output power of a driving source to a driving wheel through a power transmission mechanism, the control method comprising:
   performing, by an electronic control unit, autonomous driving of the vehicle to autonomously control at least a vehicle speed so that the vehicle speed follows a target vehicle speed that is set in advance;
   storing, by the electronic control unit, a relationship between the vehicle speed and noise that is generated by a vehicle part rotated in association with running of the vehicle;
   determining, by the electronic control unit, based on the relationship, whether the noise is equal to or larger than a determination threshold when the vehicle runs at the target vehicle speed, the determination threshold being set in advance; and
   when the electronic control unit determines that the noise is equal to or larger than the determination threshold, determining, by the electronic control unit, a vehicle speed at which the noise is lower than the determination threshold, and changing, by the electronic control unit, the target vehicle speed to the vehicle speed at which the noise is lower than the determination threshold.

* * * * *